(12) United States Patent
So (10) Patent No.: US 8,477,037 B2
(45) Date of Patent: Jul. 2, 2013

(54) ANIMAL TRAINING APPARATUS HAVING MULTIPLE RECEIVERS AND METHOD OF CONTROLLING THE SAME

(76) Inventor: Ho Yun So, Seoul (KR)

(*) Notice: Subject to any disclaimer, the term of this patent is extended or adjusted under 35 U.S.C. 154(b) by 443 days.

(21) Appl. No.: 12/707,801

(22) Filed: Feb. 18, 2010

(65) Prior Publication Data

US 2011/0199217 A1 Aug. 18, 2011

(51) Int. Cl.
*G08B 23/00* (2006.01)

(52) U.S. Cl.
USPC .................... 340/573.3; 119/719; 119/720

(58) Field of Classification Search
USPC ................................. 340/573.3; 119/719, 720
See application file for complete search history.

(56) References Cited

U.S. PATENT DOCUMENTS

| 4,802,482 | A | 2/1989 | Gonda et al. |
| 5,046,453 | A | 9/1991 | Vinci |
| 5,054,428 | A | 10/1991 | Farkus |
| 5,666,908 | A * | 9/1997 | So .................................. 119/720 |
| 6,415,742 | B1 * | 7/2002 | Lee et al. ....................... 119/721 |
| 6,474,269 | B2 | 11/2002 | So |
| 6,549,133 | B2 * | 4/2003 | Duncan et al. ............. 340/573.3 |
| 6,916,249 | B2 * | 7/2005 | Meade .......................... 472/119 |
| 7,559,291 | B2 | 7/2009 | Reinhart |
| 2008/0173255 | A1 | 7/2008 | Mainini et al. |

* cited by examiner

*Primary Examiner* — Steven Lim
*Assistant Examiner* — Kaleria Knox
(74) *Attorney, Agent, or Firm* — Sheridan Ross P.C.

(57) ABSTRACT

An animal training apparatus with multiple receiver control function is disclosed. The apparatus comprises a single transmitter and multiple receivers corresponding to the respective animals. The transmitter includes a plurality of level adjustment switches for setting shock levels of the respective receivers. When the volume of a level adjustment switch corresponding to a desired receiver is changed, a transmitter control unit stores a shock level data into a memory. An ID code corresponding to the receiver is attached to the shock level data of a selected receiver. The shock level data with the ID code is transmitted to the receivers. The receivers receive an RF signal that includes the ID code and shock level data, and generate electrical shock to be applied to the animal when the received ID code is identical to a stored ID code.

5 Claims, 9 Drawing Sheets

ANIMAL TRAINING APPARATUS HAVING MULTIPLE RECEIVERS AND METHOD OF CONTROLLING THE SAME

BACKGROUND OF THE INVENTION

1. Field of the Invention

The present invention relates to an animal training apparatus and its controlling method, and more particularly to an animal training apparatus having a single transmitter and multiple receivers, in which the transmitter controls levels of electrical shock produced in the respective receivers.

2. Description of the Related Art

Generally, an animal training device is worn on the neck of an animal, for example a dog, and is configured to control undesired behavior of the animal by applying an electrical stimulation or shock thereto. Such a conventional animal training apparatus is disclosed in U.S. Pat. No. 5,666,908 issued to So.

Figure 1:
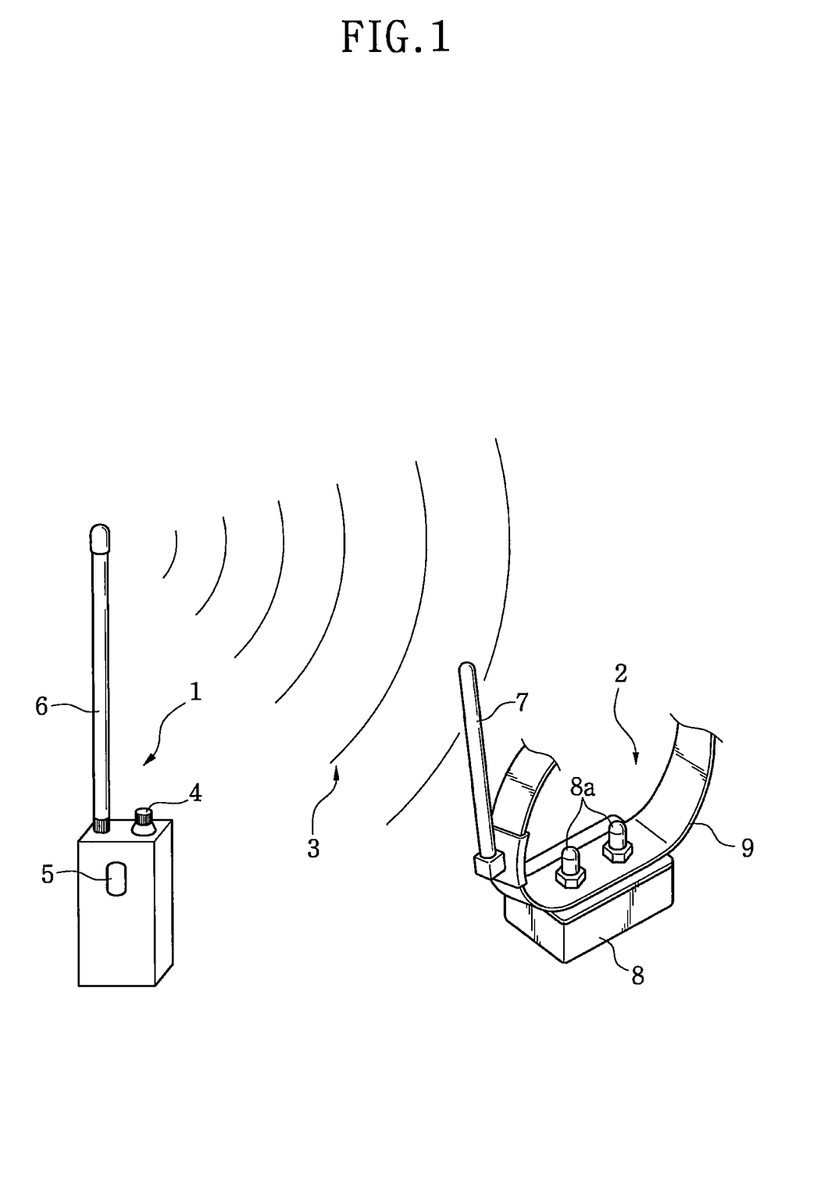
FIG. 1 is a perspective view of a conventional animal training apparatus including a single transmitter and a single receiver.

So's animal training apparatus includes a transmitter and a receiver, as shown in FIG. 1. The transmitter 1 transmits a Radio Frequency (RF) signal 3 to the receiver 2 to apply an electrical stimulation or shock to an animal according to the manipulation of the trainer who is training the animal.

The transmitter 1 includes a stimulation adjusting switch 4, a power switch 5 and a transmitting antenna 6. The stimulation adjusting switch 4 sets the level of an electrical shock to be output from the receiver 2. The power switch 5 controls the transmission of the RF signal 3 with the level set by the stimulation adjusting switch 4. The transmitting antenna 6 transmits the RF signal including the shock level indication data set by the stimulation adjusting switch 4 and ID code data required to determine a relevant receiver 2.

The receiver 2 receives the RF signal 3 transmitted from the transmitter 1, and generates an electrical shock for a predetermined period of time. The level of the electrical shock has been set by the stimulation adjusting switch 4 of the transmitter 1.

The receiver 2 includes a receiving antenna 7, a receiver control unit 8, and a pair of stimulating electrodes 8a. The receiver control unit 8 detects the RF signal received by the receiving antenna 7. The electrodes 8a are fixedly mounted to the receiver control unit 8 such that they penetrate a collar 9 and project toward the neck of the animal so as to apply an electrical shock output from the receiver control unit 8 to the animal.

However, the conventional animal training apparatus has inconvenience in that, since only a single receiver is provided for a single transmitter, a number of transmitters and a number of receivers which correspond to the number of animals to be trained must be provided when a single trainer simultaneously trains a plurality of animals, and in that, whenever each animal is trained, the trainer must use a specific transmitter corresponding to the receiver worn on respective animals.

SUMMARY OF THE INVENTION

Accordingly, an object of the present invention is to provide an animal training apparatus and its controlling method, capable of controlling multiple receivers using a single transmitter.

Another object of the present invention is to provide an animal training apparatus having multiple receivers and a method of controlling the apparatus, in which multiple level adjustment switches are provided in a single transmitter, thus enabling the level of electrical shock output from a corresponding one of multiple receivers to be controlled.

In order to accomplish the above objects, the present invention provides an animal training apparatus having a single transmitter and multiple receivers, the transmitter includes: a plurality of level adjustment switches provided to correspond to the multiple receivers and configured to set levels of electrical shock to be produced in the respective receivers; a receiver selection switch for selecting a desired receiver from the multiple receivers; a transmitter control unit configured to perform control such that the shock level data of the respective receivers set by the level adjustment switches are stored in a memory, and in response to a selection input from the receiver selection switch an identification (ID) code initially stored in the memory is attached to the shock level data of the selected receiver, and the shock level date with the ID code is formed into a data frame to be transmitted to the receivers; a display unit for displaying the shock levels set by the respective level adjustment switches under control of the transmitter control unit; and a radio frequency (RF) transmission unit for transmitting RF signals including the data frame generated from the transmitter control unit, wherein the receivers are configured to receive the RF signals including ID codes and shock level data of receivers corresponding to the level adjustment switches and to generate electrical shock, levels of which have been changed in response to the shock level data, to animals when the received ID codes are identical to ID codes stored in their own memory units.

Preferably, the transmitter control unit may comprise a selector switch configured to select shock levels set by the level adjustment switches; an A/D (Analog/Digital) converter configured to perform A/D conversion of level values set by the level adjustment switches selected by the selector switch; a central processing unit configured to allow the level adjustment switches to be sequentially selected by controlling the selector switch such that level values set by the level adjustment switches to be input to and A/D converted by the A/D converter, to store the converted level data in the memory, to read a level data from the memory in response to receiver selection signals input from the multiple receiver selection switches, to attach ID code data of the corresponding receivers to the level data, and to transmit the level data with the ID codes attached thereto to the receivers; and a memory configured to sequentially store the level values of the level adjustment switches obtained by the A/D conversion.

Preferably, the level adjustment switches may be implemented using volume switches (variable resisters), dip switches or encoder switches.

Preferably, the transmitter control unit may display a level value of a level switch corresponding to a receiver selection signal input from the multiple receiver selection switches on the display unit, and may display an icon of an animal, including a number of a receiver corresponding to the level switch, together with the level value.

Further, in order to accomplish the above objects, the present invention provides a method of controlling an animal training apparatus having multiple receivers, comprising the steps of (a) storing identification (ID) code data allocated to the respective receivers in a memory; (b) determining whether there is switch input from multiple receiver selection switches, and, if it is determined that there is no switch input, reading set level values from the respective level adjustment switches and sequentially storing the level values in the memory; (c) reading the level values of respective receivers stored in the memory, sequentially displaying the level values together with icons of animals corresponding to the receivers, on a display unit, and returning to step (b); (d) if it is determined at step (b) that there is switch input from any one of the multiple receiver selection switches, reading an ID code and a level value of a receiver selected by the receiver selection switch from the memory; (e) completing a frame of packet data by attaching the level value to the read ID code, and then transmitting the completed packet data to the multiple receivers; and (f) outputting the level value of the selected receiver and an icon of an animal corresponding to the receiver to the display unit, displaying together the level value and the animal icon, returning to step (a), and repeating a procedure after step (a).

Preferably, when the level adjustment switches are implemented using volume switches, level values set by the level adjustment switches may be A/D converted, and then digital level values may be sequentially stored in the memory.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 2:
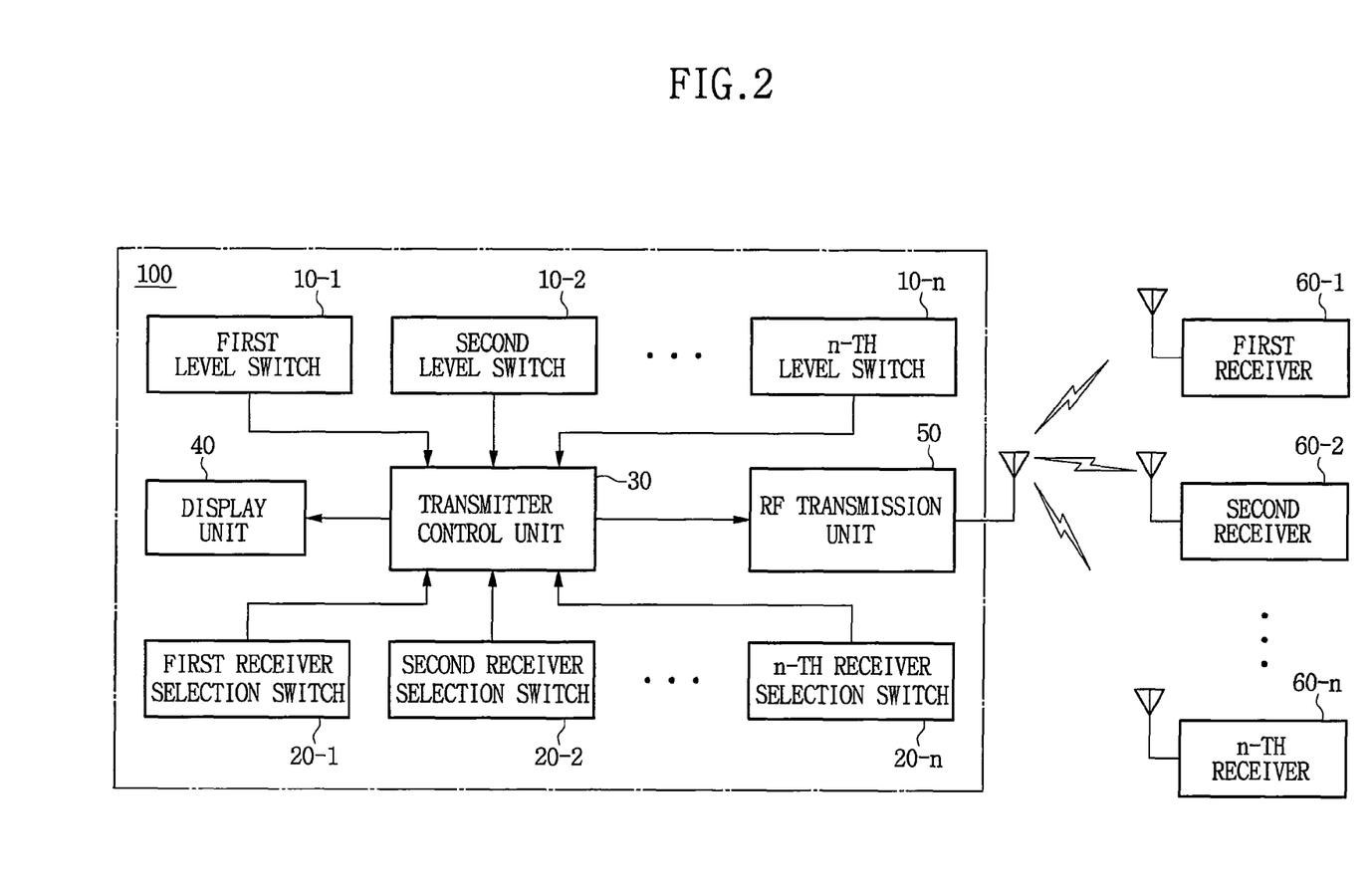
FIG. 2 is a block diagram showing the construction of an animal training apparatus including a single transmitter and multiple receivers according to the present invention.

FIG. 2 is a block diagram showing the construction of an animal training apparatus having a single transmitter and multiple receivers according to the present invention.

The transmitter 100 of the animal training apparatus according to the present invention includes a plurality of level adjustment switches 10-1, 10-2, . . . , 10-n, a plurality of receiver selection switches 20-1, 20-2, . . . , 20-n, a transmitter control unit 30, a display unit 40, and a Radio Frequency (RF) transmission unit 50. The level adjustment switches 10-1, 10-2, . . . , 10-n are provided to correspond to the receivers, and are configured to set the levels of shock of multiple receivers 60-1, 60-2, . . . , 60-n, respectively. The receiver selection switches 20-1, 20-2, . . . , 20-n select a relevant receiver, the shock level of which is to be set, from among the multiple receivers 60-1, 60-2, . . . , 60-n.

The transmitter control unit 30 performs control such that the shock levels of the respective receivers, set by the level adjustment switches 10-1, 10-2, . . . , 10-n, are stored in memory 32, and such that, according to the input from the receiver selection switches, an ID code corresponding to the input is attached to the shock level data of a selected receiver, stored in the memory 32, and then the shock level data with the ID code attached thereto is transmitted to the receivers. The display unit 40 displays the shock levels set by the level adjustment switches 10-1, 10-2, . . . , 10-n under the control of the transmitter control unit 30. The RF transmission unit 50 transmits RF signal data, in which the ID code is attached to the shock level data of the receiver selected by the input receiver selection switch, under the control of the transmitter control unit 30.

The receivers 60-1, 60-2, . . . , 60-n of the animal training apparatus according to the present invention are configured to receive RF signals from the transmitter 100, which include the ID codes and the shock level data of receivers corresponding to relevant level adjustment switches, and to apply electrical shocks, the levels of which have been changed according to the shock level data, to corresponding animals when the received ID codes are identical to ID codes stored in their own memory units provided in the receivers.

Figure 3:
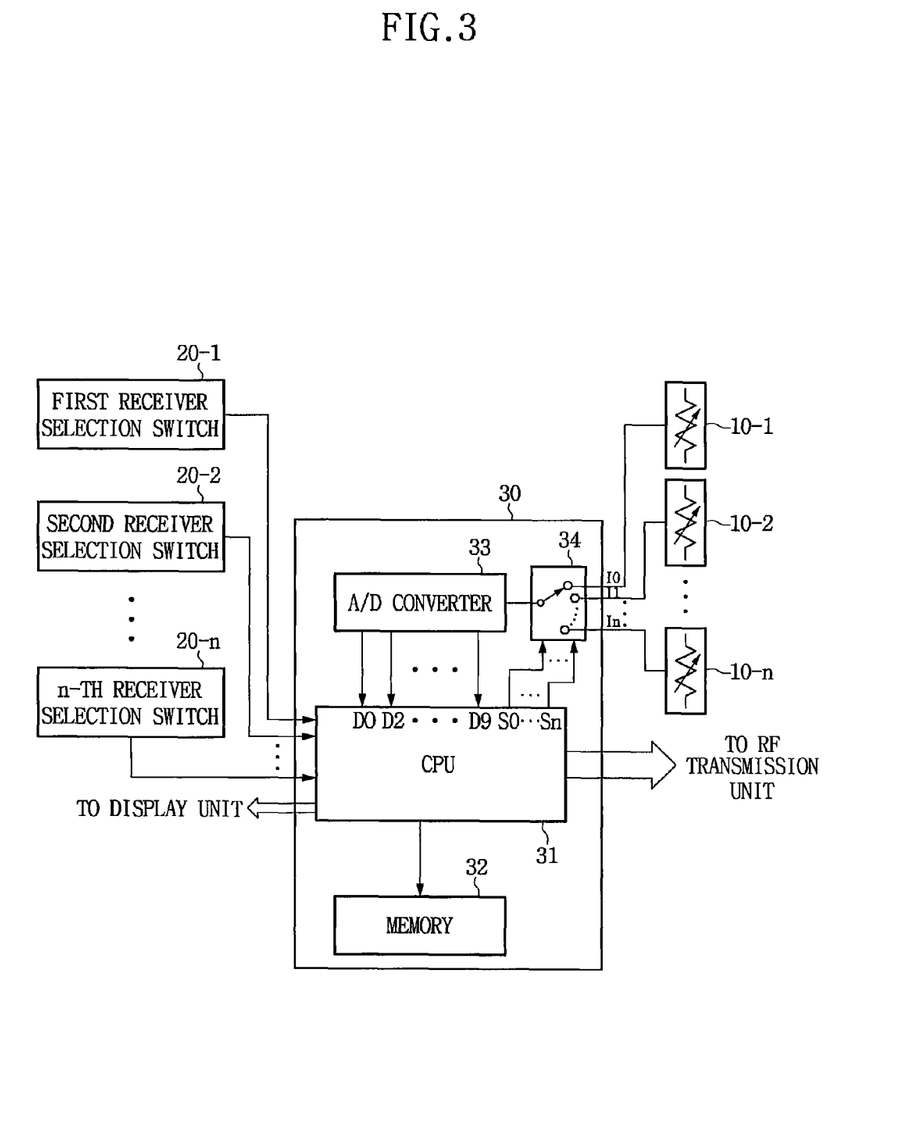
FIG. 3 is a block diagram showing the construction of a transmitter control unit for performing A/D conversion on the level values of multiple level adjustment switches and storing and displaying the converted level values according to the present invention.

FIG. 3 is a block diagram showing the construction of the transmitter control unit for performing Analog/Digital (A/D) conversion on the level values of a plurality of level adjustment switches and storing and displaying the level values.

The transmitter 100 of the animal training apparatus according to the present invention includes a plurality of level adjustment switches 10-1, 10-2, . . . , 10-n corresponding to multiple receivers 60-1, 60-2, . . . , 60-n, and can set shock levels for respective receivers (for example, the second receiver 60-2).

The level adjustment switches 10-1, 10-2, . . . , 10-n correspond to the multiple receivers 60-1, 60-2, . . . , 60-n in a one-to-one correspondence, and the level values respectively set by the level adjustment switches 10-1, 10-2, . . . , 10-n are input to the input terminals I0 to In of the transmitter control unit 30.

The level values input to the input terminals I0 to In of the transmitter control unit 30 are connected to the input terminal of an Analog/Digital (A/D) converter 33 through a selector switch 34. The selector switch 34 is controlled by a Central Processing Unit (CPU) 31 to enable the values set by the level adjustment switches 10-1, 10-2, . . . , 10-n to be sequentially input to the input terminal of the A/D converter 33 and to be A/D converted.

That is, the CPU 31 of the transmitter control unit 30 outputs control data "0000" required to select the first level switch 10-1 to the selector switch 34 through selection control terminals S1 to Sn.

Figure 4A:
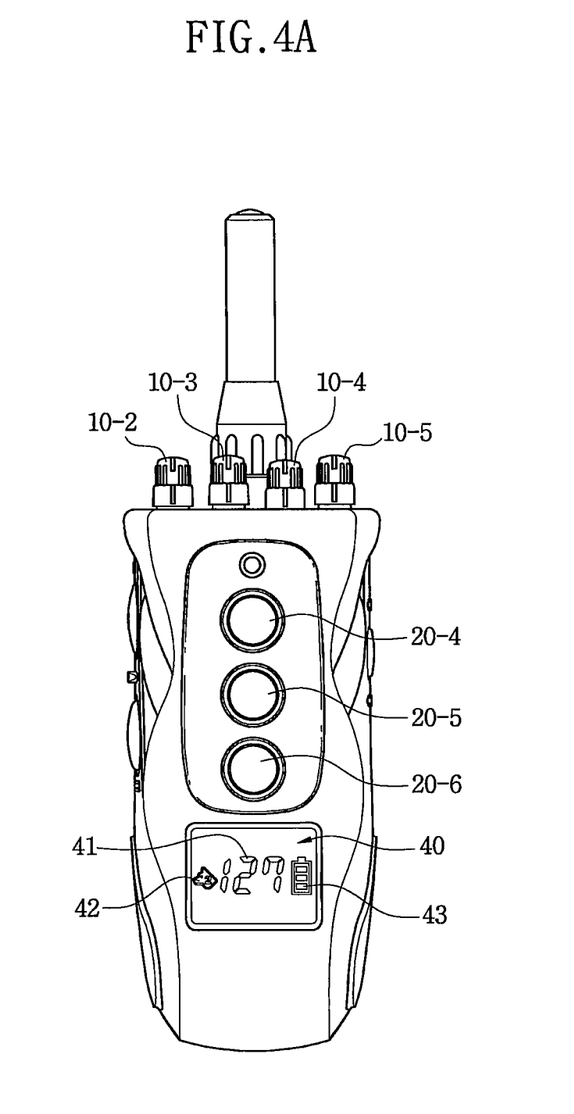
FIG. 4A is a front view of a transmitter according to the present invention.

The selector switch 34, having received the control data "0000" connects the first level switch 10-1 to the input terminal of the A/D converter 33, and enables the value set by the first level switch 10-1 to be A/D converted. The value set by the first level switch 10-1 is converted into 10-bit digital data by the A/D converter 33 and is stored in the memory 32. As shown in FIG. 4A, the value set by each level switch is displayed on the display unit 40 in 128 steps ranging from 0 to 127.

For example, when the CPU 31 outputs 4-bit control data "S0 to S4=0001" to the selector switch 34, the second level switch 10-2 is selected, and the value set by the second level switch 10-2 is input to the input terminal of the A/D converter 33 and is A/D converted.

Similarly to this, in the case of the remaining level adjustment switches 10-3, 10-4, . . . , 10-n, operations are performed in such a way that control data required to select a relevant level switch (for example, in the case of the third level switch, "S0 to S4=0010") is output to the selector switch 34 to enable the relevant level switch (for example, the third level switch 10-3) to be connected to the input terminal of the A/D converter 33, and that the value set by each level switch (for example, a voltage level of 0 to 3 V) is converted into 10-bit digital data by the A/D converter 33 and is stored in the memory 32, and the value set by the level switch is displayed on the display unit 40 in 128 steps ranging from 0 to 127.

In this case, an icon of an animal, which is wearing a relevant receiver (for example, the second receiver 60-2) corresponding to the relevant level switch (for example, the second level switch 10-2), is displayed besides the level value displayed on the display unit 40 (in practice, the number of the relevant receiver "2" is displayed in the icon of the animal), as shown in FIG. 4A, and thus the current value set for each receiver is displayed.

Figure 4B:
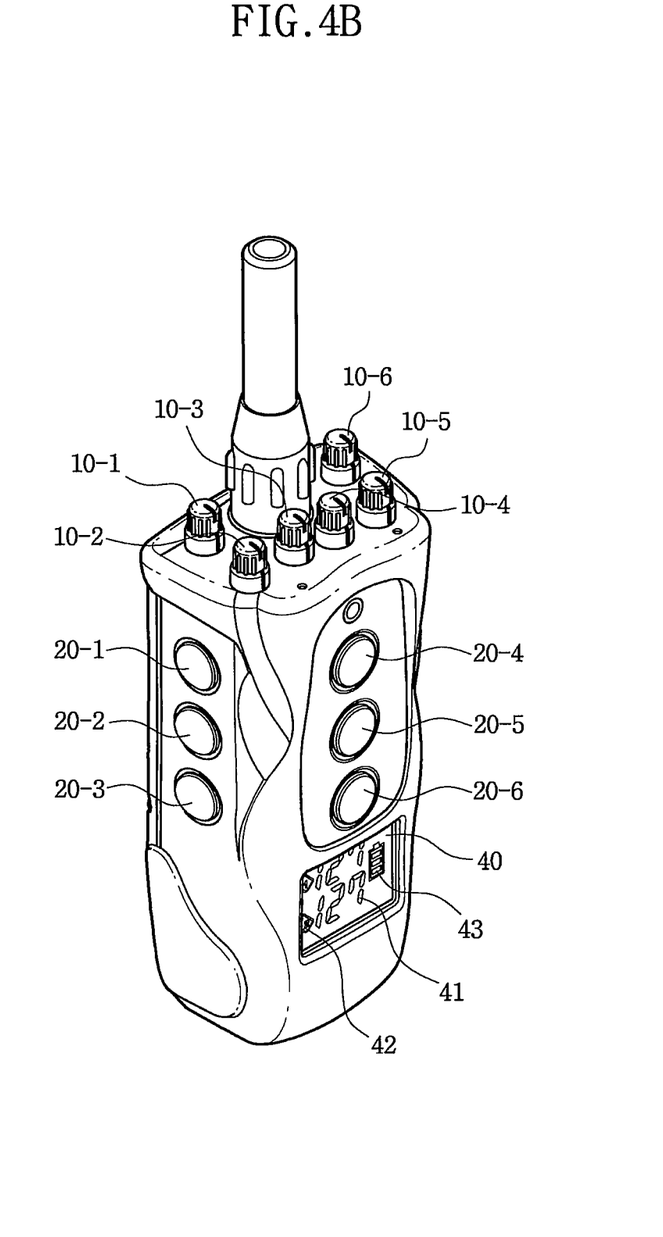
FIG. 4B is a perspective view of the transmitter according to the present invention.

In FIG. 4B, an example in which six level adjustment switches 10-1, 10-2, 10-3, 10-4, 10-5, and 10-6 are installed is shown. However, according to the circumstances, more level adjustment switches can be installed. In that case, there is insufficient space on the outside of the transmitter 100 for the level adjustment switches to be installed, and it is difficult to control multiple level adjustment switches, and thus ten or less level adjustment switches are preferably installed.

As described above, the level values of the receivers 60-1, 60-2, . . . , 60-n, set by the level adjustment switches 10-1, 10-2, . . . , 10-n, are converted into 10-bit digital data by the A/D converter 33, are stored in the memory 32, and are displayed on the display unit 40.

The level values of the receivers 60-1, 60-2, . . . , 60-n stored in the memory 32 in this way are used in such a way that, when the user selects and presses one from among the multiple receiver selection switches 20-1, 20-2, . . . , 20-n, the CPU 31 reads a level value, corresponding to the receiver selected by the selected receiver selection switch (for example, the receiver selection switch 20-1), from the memory 32, attaches the ID code of the relevant receiver (for example, the first receiver 60-1) to the level value, and transmits the level value with the ID code attached thereto to a corresponding one of the receivers 60-1, 60-2, . . . , 60-n through the RF transmission unit 50.

Figure 5:
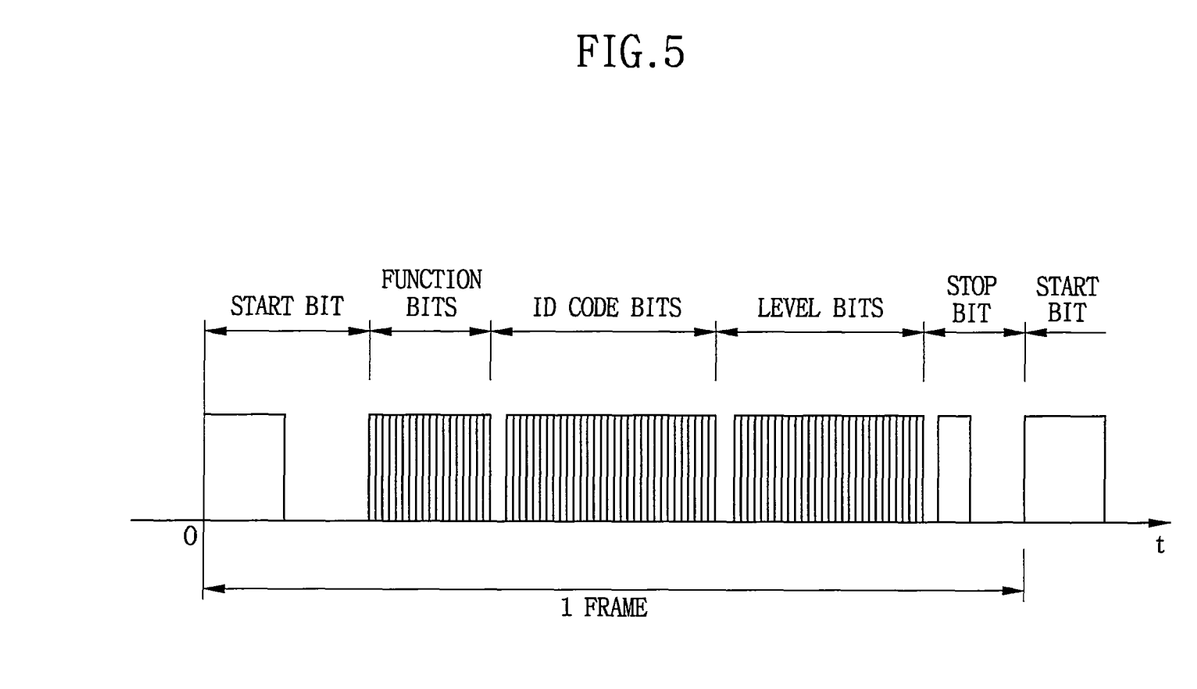
FIG. 5 is a diagram showing an example of one frame constituting transmission data transmitted from the transmitter according to the present invention.

FIG. 5 illustrates an example of a single frame of transmission data transmitted by the transmitter according to the present invention.

The single frame of transmission data is comprised of a start bit indicating the start of the frame, function bits indicating the function of vibration or electric shock, identification (ID) code bits required to allow a specific receiver to be identified from multiple receivers, level bits indicating the level of vibration or electric shock, and a stop bit indicating the end of the frame.

The ID code bits are composed of 15 bits, and a single 15-bit code is allocated to each of the receivers 60-1, 60-2, . . . , 60-n. When each of the receivers 60-1, 60-2, . . . , 60-n receives a data signal from the transmitter 100, the receiver compares the ID code bits of the received data frame with its own ID code bits stored in the memory unit of the receiver, and determines that the data signal is correct data transmitted to the receiver itself when the received ID code bits are identical to the stored ID code bits.

When the user desires to change the shock level to be applied to, for example, an animal (for example, a dog) which is wearing the second receiver 60-2, while training a plurality of animals, he or she sets the level of the second level switch 10-2 to a desired value.

The CPU 31 is configured to read values set by the level adjustment switches 10-1, 10-2, . . . , 10-n by controlling the selector switch 34, to allow each of the set values to be converted into 10-bit digital data by the A/D converter 33, to sequentially store respective pieces of 10-bit digital data in the memory 32, and then to update previously set values. Therefore, the level value of the second level switch 10-2 set by the user is also updated and stored in the memory 32, as described above.

The level value of the second level switch 10-2, updated and stored in the memory 32 in this way, is displayed as a decimal level value 41 on the seven segments of the display unit 40 under the control of the CPU 31, as shown in FIG. 4A. An icon of the animal (the number of the receiver "2" is displayed in the icon) which is wearing the receiver 60-2 corresponding to the second level switch 10-2 is displayed together with the level value. A battery icon 43 indicates the amount of power remaining in the battery.

When the user selects the second receiver selection switch 20-2 from among the multiple receiver selection switches 20-1, 20-2, . . . , 20-n after checking the level value displayed on the display unit 40, a signal required to select the second receiver 60-2 is input to the CPU 31 of the transmitter control unit 30.

The CPU 31 of the transmitter control unit 30, having received the signal required to select the second receiver 60-2, reads the ID code and the level value of the second receiver 60-2 stored in the memory 32 and generates a data frame to transmit the ID code and the level value to the second receiver 60-2 through the RF transmission unit 50.

The second receiver 60-2 reads the ID code and the level value from the received RF signal, changes the current level of electrical shock according to the read level value, and applies the level-changed electrical shock to the animal which is wearing the second receiver 60-2.

The RF signal for changing the level value of the second level switch 10-2 transmitted from the RF transmission unit 50 is received by the multiple receivers 60-1, 60-2, . . . , 60-n. However, receivers other than the second receiver 60-2 determine that the ID code included in the received RF signal is not identical to their own ID codes, and thus they do not change their current shock level.

The above-described level adjustment switches are implemented using volume switches which use typical variable resistors, but they are not limited to the volume switches and may be implemented using dip switches which output set level values as binary numbers, or encoder switches which change and output the number of pulses according to the number of increment steps or decrement steps.

Figure 6A:
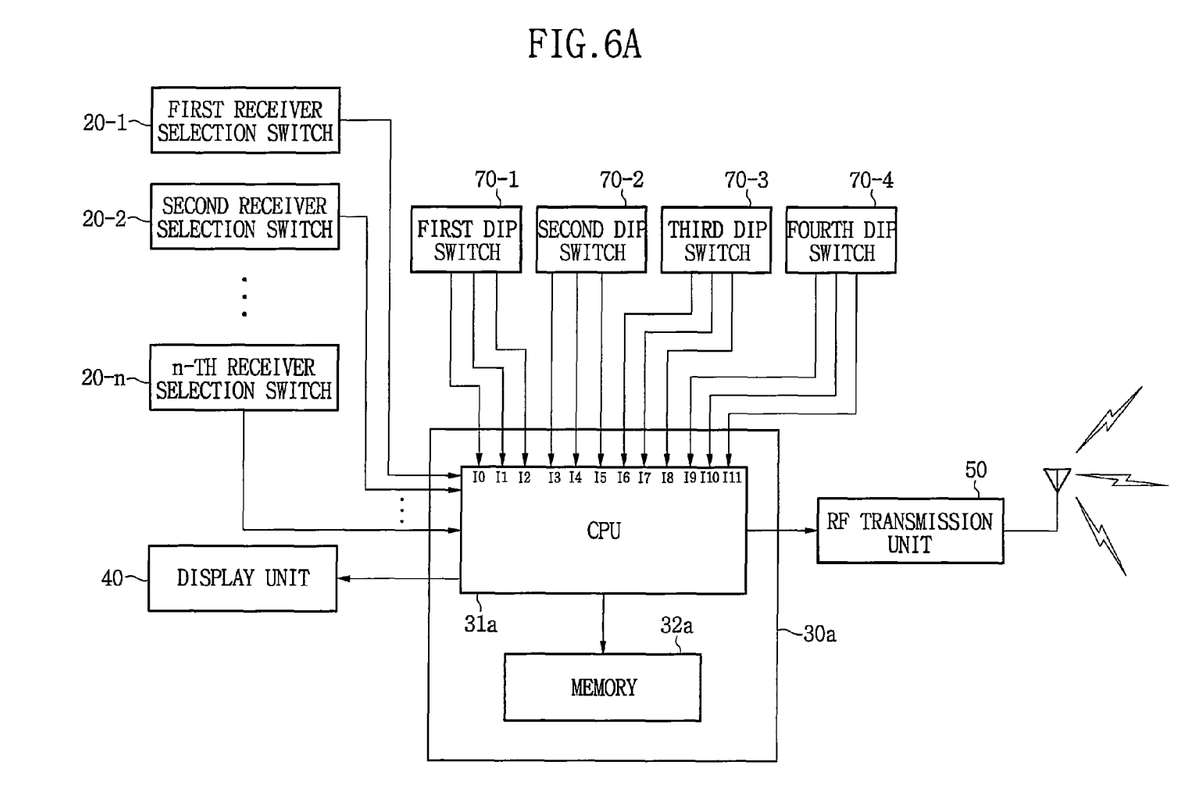
FIGS. 6A and 6B are block diagrams showing transmitters implemented using dip switches and encoder switches, respectively, according to the present invention.
Figure 6B:
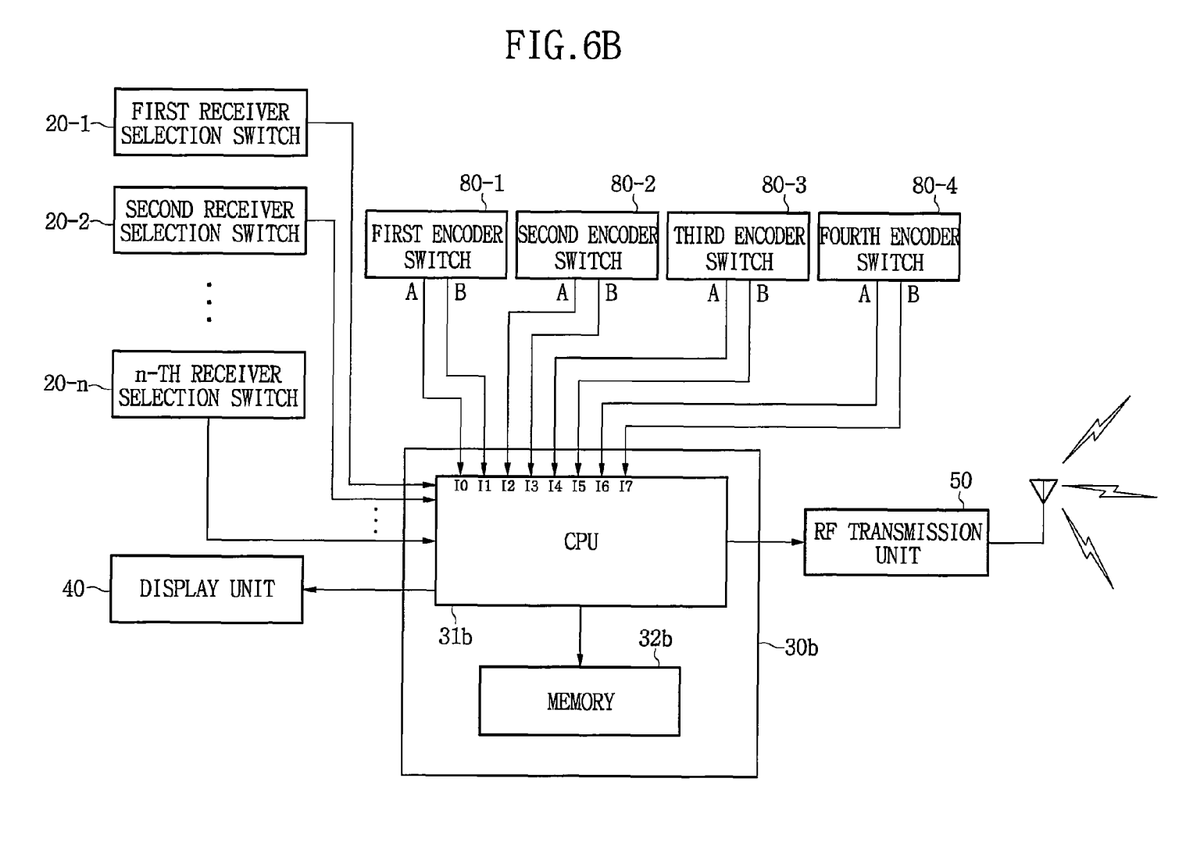

FIGS. 6A and 6B are block diagrams showing transmitters implemented using dip switches and encoder switches, respectively, according to the present invention.

A transmitter can be constructed using four dip switches 70-1, 70-2, 70-3 and 70-4, each capable of setting a level value to eight steps, instead of volume switches, according to the present invention, as shown in FIG. 6A.

Since each of the four dip switches 70-1, 70-2, 70-3, 70-4 sets a level value to eight steps, the output value is represented as a 3-bit binary value. Therefore, the output terminals of the four dip switches 70-1, 70-2, 70-3 and 70-4 are connected to the input terminals I0 to I11 of a CPU 31a, and thus the CPU 31a receives a 3-bit level value output from each of the dip switches.

When four or more receivers are used, four or more dip switches are used. Further, when the level of each dip switch is set as being of eight or more steps, the number of output terminals of each dip switch increases, and then a larger number of input terminals of the CPU 31a are required.

In this case, the number of required input terminals can be reduced by selecting a desired dip switch using the selector switch and receiving a set level value from the output terminals of the dip switch (for example, when the number of steps of the dip switch is 32 steps, a number of output terminals corresponding to 5 bits are required).

As another embodiment, the transmitter can be constructed using encoder switches 80-1, 80-2, 80-3 and 80-4, instead of volume switches, as shown in FIG. 6B. Each of the encoder switches 80-1, 80-2, 80-3 and 80-4 has two output terminals A and B.

As each of the encoder switches 80-1, 80-2, 80-3 and 80-4 is rotated clockwise, a rising pulse for increasing a level is output from the terminal "A" a predetermined number of times corresponding to the number of steps the encoder switch is rotated clockwise. The level can increase up to 20 steps through a single rotation, and can increase up to a maximum of 127 steps through six clockwise rotations, each enabling seven steps.

In contrast, as each of the encoder switches 80-1, 80-2, 80-3 and 80-4 is rotated counterclockwise, a falling pulse for decreasing a level is output from the terminal "B" a predetermined number of times corresponding to the number of steps the encoder switch is rotated counterclockwise. The level can decrease to 20 steps through a single rotation, and can decrease to a maximum of 127 steps through six counterclockwise rotations, each enabling seven steps.

The two output terminals A and B of each of the encoder switches 80-1, 80-2, 80-3 and 80-4 are connected to the input terminals I0 to I7 of the CPU 31b, so that pulses output from the respective encoder switches are input to the CPU 31b through the input terminals I0 to I7.

For example, when the user rotates the first encoder switch 80-1 clockwise in three steps, three rising pulses are input to the input terminal I0 of the CPU 31b, so that the value required to set the level of the first receiver 60-1 to a third step is stored in memory 32b. With the rotation of the first encoder switch 80-1, the value set by the first encoder switch 80-1 is displayed on the display unit 40 in 128 steps ranging from 0 to 127, as shown in FIG. 4A.

The set level value of the first encoder switch 80-1, stored in the memory 32b in this way, is used in such a way that, when the user selects the first receiver selection switch 20-1 from among the receiver selection switches 20-1, 20-2, . . . , 20-n, and presses the first receiver selection switch 20-1, the CPU 31b reads a level value corresponding to the selected first receiver selection switch 20-1 from the memory 32b, attaches the ID code of the first receiver 60-1 to the level value, and transmits the level value with the ID code attached thereto to individual receivers through the RF transmission unit 50.

When the first encoder switch 80-1 is rotated counterclockwise, falling pulses are output to the CPU 31b, and a set level value corresponding to the falling pulses is stored in the memory 32b and is displayed on the display unit 40, as described above. Thereafter, as the relevant receiver selection switch is pressed, the ID code of a corresponding receiver is attached to the level value, and the level value with the ID code attached thereto is transmitted to individual receivers 60-1, 60-2, . . . , 60-n through the RF transmission unit 50.

Figure 7:
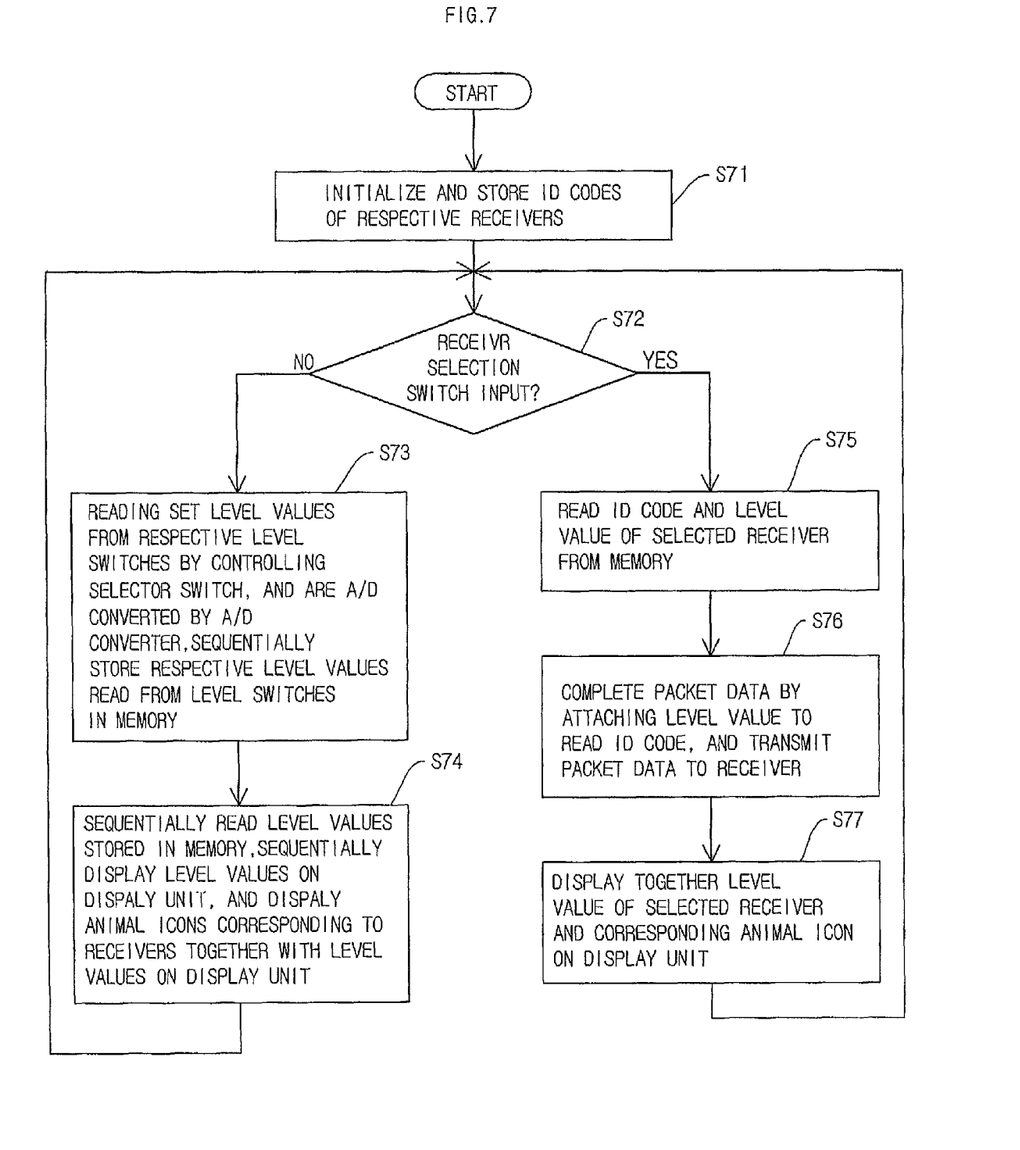
FIG. 7 is a flowchart showing a method of controlling the animal training apparatus having multiple receivers according to the present invention.

FIG. 7 is a flowchart showing a method of controlling the animal training apparatus having multiple receivers according to the present invention.

At step S71, the counters, flags, switches and addresses of hardware and software are initialized so as to control the animal training apparatus having multiple receivers according to the present invention, and ID codes allocated to the respective receivers are stored in memory.

Whether there is switch input from the receiver selection switches 20-1, 20-2, . . . , 20-n is determined at step S72. If it is determined that there is no switch input, level values set by the respective level adjustment switches 10-1, 10-2, . . . , 10-n are read from the level adjustment switches and are A/D converted by the A/D converter 33, and thereafter digital level values are sequentially stored in memory 32 at step S73.

As in other embodiments, when dip switches or encoder switches are used, digital data or pulses are directly received from the dip switches or encoder switches without the level values being converted into digital values by the A/D converter 33, so that the level values are set.

The level values of the respective receivers are read from the memory 32, and are sequentially displayed on the display unit 40 together with animal icons corresponding to the receivers of the read level values at step S74.

Meanwhile, when there is switch input from any one (for example, the second receiver selection switch 20-2) of the multiple receiver selection switches 20-1, 20-2, . . . , 20-n, the ID code and the level value of the receiver selected by the receiver selection switch 20-2 are read from the memory 32 at step S75.

The frame of packet data is completed by attaching the level value to the read ID code, as shown in FIG. 5, and the completed packet data is transmitted to the multiple receivers 60-1, 60-2, . . . , 60-n at step S76.

Both the level value of the selected receiver (for example, the second receiver 60-2) and an icon of an animal corresponding to the selected receiver are output to the display unit 40, thus enabling the relevant animal icon to be displayed together with the level value ranging from 0 to 127 steps at step S77. Thereafter, the process returns to step S72, and a procedure after step S72 is repeated.

As described above, the present invention is advantageous in that multiple level adjustment switches corresponding to multiple receivers are provided in a single transmitter, and level values are changed using the level adjustment switches, so that the level of vibration or electric shock output from a corresponding one of the multiple receivers is changed, thus enabling the level of vibration or electric shock output from the multiple receivers to be controlled using the single transmitter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An animal training apparatus comprising:
 a single transmitter and multiple receivers, wherein the transmitter includes:
 a plurality of level adjustment switches provided to correspond to the multiple receivers and configured to set levels of an electrical shock to be produced in the respective receivers;
 a receiver selection switch for selecting a desired receiver from the multiple receivers;

a transmitter control unit comprising a selector switch configured to select vibration or shock levels set by said plurality of level adjustment switches and to input the vibration or shock levels to an input terminal of an Analog/Digital (A/D) converter, the A/D converter configured to perform A/D conversion on said vibration or shock levels set by said plurality of level adjustment switches, a central processing unit configured to allow said plurality of level adjustment switches to be sequentially selected by controlling the selector switch, allow each of said vibration or shock levels set by the plurality of level adjustment switches to be input to and A/D converted by the A/D converter, store the converted vibration or shock levels in a memory, read vibration or shock level of receiver corresponding to receiver selection signal input from the receiver selection switch from the memory, attach an identification (ID) code of the corresponding receiver to said read vibration or shock levels, and transmit said read vibration or shock level with the ID code attached thereto to the corresponding receiver and the memory configured to sequentially store said converted vibration or shock levels set by said level adjustment switches obtained by A/D conversion under control of the central processing unit, and configured to perform control such that the vibration or shock level data of the respective receivers set by the level adjustment switches are stored in said memory, and in response to a selection input from the receiver selection switch the ID code of said selected receiver initially stored in the memory is attached to the vibration or shock level data of the selected receiver, and the shock level date with the ID code is formed into a data frame to be transmitted to the receivers;

a display unit for displaying vibration or shock levels set by the respective level adjustment switches under control of the transmitter control unit; and a radio frequency (RF) transmission unit for transmitting RF signals including the data frame generated from the transmitter control unit, wherein the receivers are configured to receive the RF signals including ID codes and vibration or shock level data of receivers corresponding to the level adjustment switches and to generate vibration or electrical shock, levels of which have been changed in response to the vibration or shock level data, to animals when the received ID code is identical to ID codes code stored in their own memory units.

2. The animal training apparatus according to claim 1, wherein the plurality of level adjustment switches are implemented using volume switches, dip switches or encoder switches.

3. The animal training apparatus according to claim 1, wherein the transmitter control unit displays vibration or shock level set by said level adjustment switch corresponding to a receiver selection signal input from said receiver selection switch on the display unit, and displays an icon of an animal, including a number of a receiver corresponding to the level adjustment switch, together with said vibration or shock level.

4. A method of controlling an animal training apparatus having multiple receivers, comprising:
   (a) storing identification (ID) code data allocated to the respective receivers in a memory provided in a transmitter;
   (b) determining whether there is switch input from the multiple receiver selection switches, and, if it is determined that there is no switch input, reading set level values from respective level adjustment switches by controlling a selector switch to be connected to an input terminal of an Analog/Digital (A/D) converter and wherein the set level values are A/D converted by the A/D converter, sequentially storing the A/D converted level values in the memory;
   (c) reading the set level values of respective receivers stored in the memory, sequentially displaying the set level values together with icons of animals corresponding to the receivers, on a display unit, and returning to step (b);
   (d) if it is determined at step (b) that there is switch input from any one of said receiver selection switches, reading the ID code and the set level value of a receiver selected by the receiver selection switch from the memory;
   (e) completing a frame of packet data by attaching the set level value to the read ID code, and then transmitting the completed packet data to the multiple receivers; and
   (f) outputting the set level value of the selected receiver and an icon of an animal corresponding to the receiver to the display unit, displaying together the level value and the animal icon, returning to step (b), and repeating at least one of steps (b)-(f).

5. The method according to claim 4, wherein when the level adjustment switches are implemented using volume switches, level values set by the level adjustment switches are A/D converted, and then said converted digital level values are sequentially stored in the memory.

* * * * *